May 18, 1943.  S. ANDERSON ET AL  2,319,196
APPARATUS FOR MEASURING THE THICKNESS OF METALLIC PLATING ON BASES
Filed July 24, 1939  2 Sheets-Sheet 1

Inventors:
Stanley Anderson &
Robert W. Manuel
By Joseph O. Lange
Atty.

May 18, 1943. S. ANDERSON ET AL 2,319,196
APPARATUS FOR MEASURING THE THICKNESS OF METALLIC PLATING ON BASES
Filed July 24, 1939 2 Sheets-Sheet 2
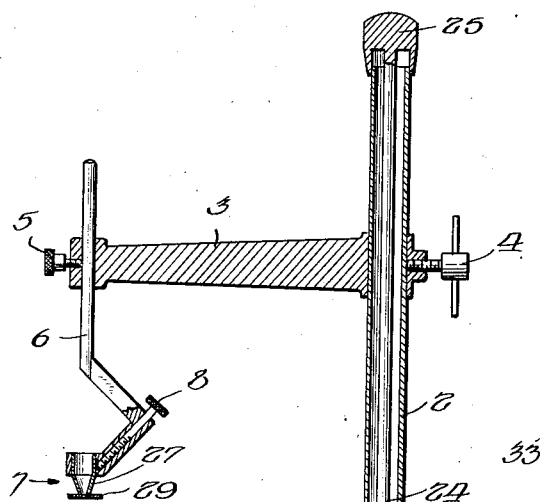
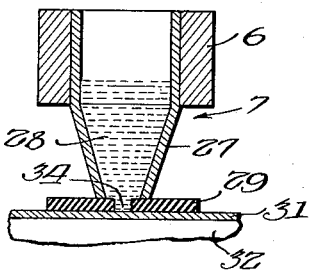
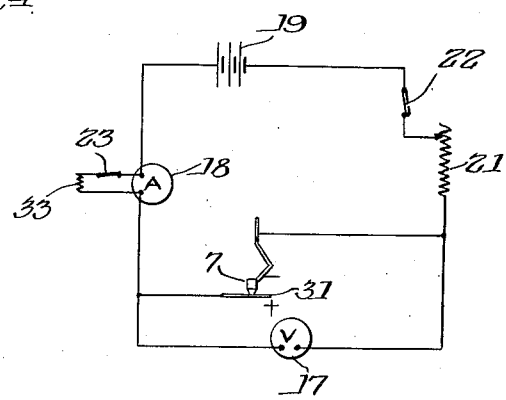
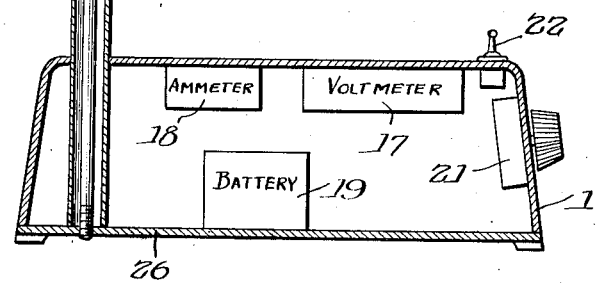
Inventors:
Stanley Anderson &
Robert W. Manuel
By Joseph O. Lange
Atty.

Patented May 18, 1943

2,319,196

UNITED STATES PATENT OFFICE 2,319,196

APPARATUS FOR MEASURING THE THICKNESS OF METALLIC PLATING ON BASES

Stanley Anderson and Robert W. Manuel, Chicago, Ill., assignors to Crane Co., Chicago, Ill., a corporation of Illinois Application July 24, 1939, Serial No. 286,158

1 Claim. (Cl. 204—195)

This invention relates to an apparatus and the method of using the apparatus for determining the thickness of metal plating and the like, as for example chromium and nickel plating. More particularly, the invention relates to an apparatus and method for electrolytically measuring the thickness of the plate at any location on the base whether the surface is plane or curved.

The need for a convenient, rapid and accurate method of determining the local thickness, rather than the usual average thickness of metallic plating on a base, has long been recognized. At present the most commonly used method of checking plate thickness is that of removing the plate by dissolution in a chemical and subsequently analyzing the chemical solution. This method of measurement, if the area of the surface from which the plate has been removed is precisely known, is accurate only as a means of determining an average thickness of the plate. Obviously, on certain types of surfaces the distribution of the plate may be very uneven, and in such an event, it is much more desirable to measure the thickness of the plate at locations where, by reason of the contour of the surface, it may have a tendency to deposit lightly, or where, depending upon the article to which the plate has been applied, it may be subjected to greater wear than other portions of the plated surface. The invention described herein makes possible a convenient, rapid and reasonably accurate determination of local thickness of such metallic plating.

One of the most important objects of the invention lies in the provision of an instrument and method for electrolytically stripping a relatively small restricted and predetermined area of metallically plated surface, the said stripping taking place at a fixed or known rate whereby the time required to strip the said area is directly proportional to the thickness of the plate upon the said surface. It is realized, of course, that stripping a plated surface electrolytically and measuring the time thus required is not basically new, but previously known methods have been applicable only to special types of surfaces such as, for example, flat or cylindrical, and have therefore lacked the convenience of application of this invention.

Another object is to provide an apparatus which is capable of reproducing a stripping area on successive measurements or which, if the area is not susceptible to reproduction, is capable of reproducing the current density by means of voltage regulation.

Another important object is to provide a method and means for determining plate thickness which does not necessitate the destruction of the article to which the plating has been applied.

A still further object of the invention lies in the provision of a portable plating thickness measuring apparatus which is adaptable for use upon substantially all sizes and shapes of plated articles.

Another object is to provide an apparatus which is capable of successively measuring the local thickness of a plurality of different metal coatings deposited one upon another upon a base.

It is also an object of the invention to provide an electrolytic metallic plate stripping cell which produces a relatively uniform current distribution over the surface to be stripped of its plate whereby the stripping will proceed at an even rate. The same instrument can be used for determining thicknesses of various kinds of plating, it being necessary only to select a suitable electrolyte and cathode material.

Various other objects and advantages of the present invention will be apparent from the embodiment of the invention herein disclosed and its novel features will be pointed out in connection with the appended claim.

In the drawings:

Fig. 2 is a vertical sectional view of the instrument embodying our invention.

Fig. 3 is a magnified vertical sectional view of the electrolytic cell or electrolyte holding cup.

Fig. 4 is a diagrammatical sketch of the electrical circuit employed by the instrument.

Like reference numerals refer to similar parts throughout the various views of the drawings.

Figure 1:
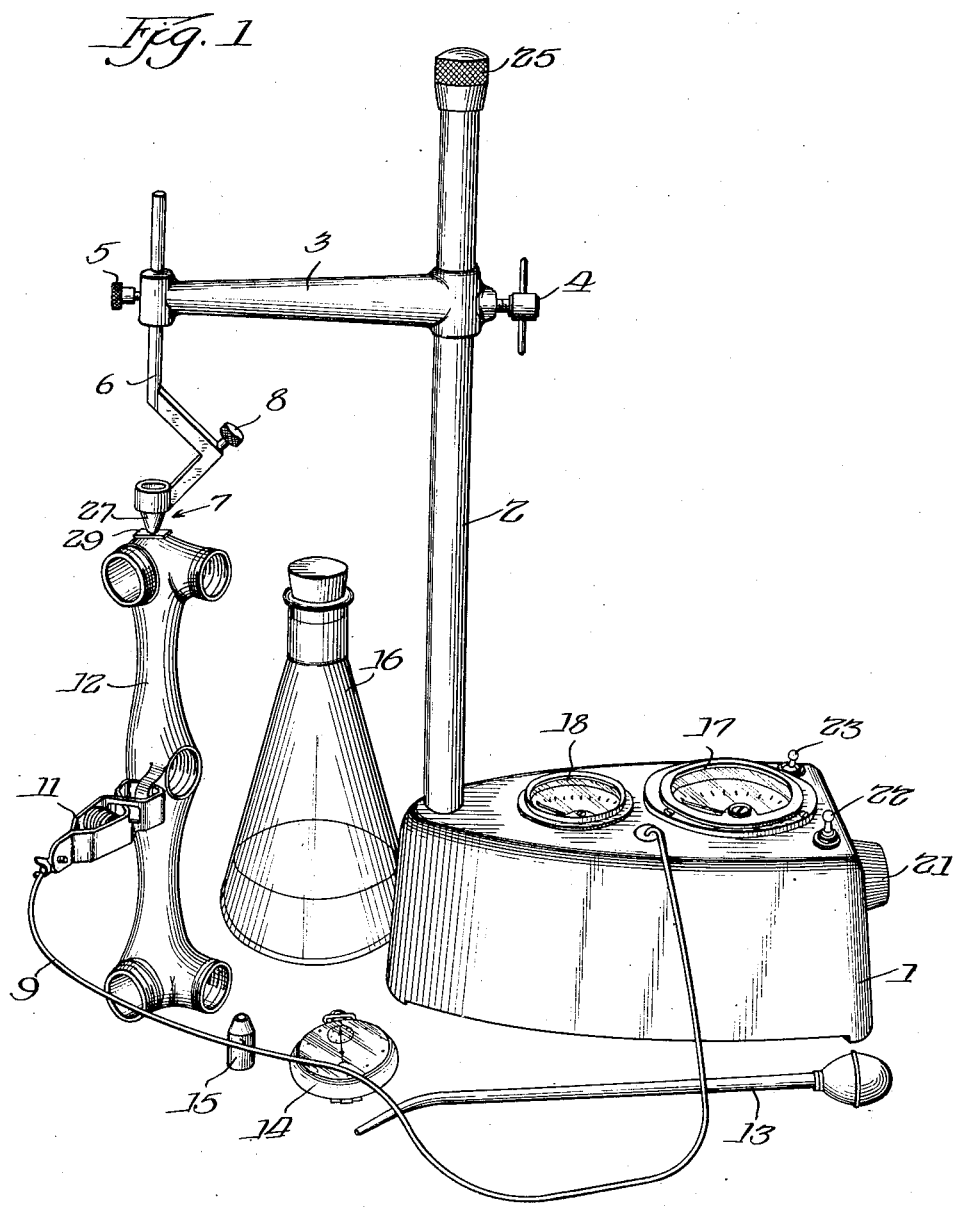
Fig. 1 is a perspective view of an instrument embodying our invention together with accessories which are normally required in the determination of metallic plate thickness. In the figure the instrument is shown as it may be adjusted for use in measuring the thickness of the metallic plating on one end of a kitchen sink water supply fitting.

The embodiment of the present invention herein shown and described represents only the preferred construction of the apparatus. It is to be recognized that numerous changes and modifications may be made without departing from the spirit and scope of the invention. Also, for purposes of illustration only, the method of measuring the thickness of chromium plating on a plumbing fitting will be described in detail. It is to be understood that the method, altered by the proper choice of an electrolyte solution, may be employed for the determination of the thickness of other metallic platings such as, for example, nickel and the like.

Referring to Fig. 1, the apparatus comprises a suitable base 1 that may be employed as a container for the necessary electrical equipment which will be hereinafter described in greater detail. A post 2 extends upwardly from the base and provides a slide for the vertical adjustment of the arm 3 which may be rigidly positioned at any desired location on the post 2 by means of the setscrew 4. The outermost end of the arm 3 is provided with a hub and setscrew 5 and carries the supporting member 6 for the electrolytic cell 7. The cup for the cell 7 is secured to the member 6 by the setscrew 8. An electrical wire 9 and spring clip 11 provide the anode connection between the base 1 and the plumbing fitting 12, the latter being the article having the plating to be measured.

Accessories shown which complete the required equipment for conducting a test include a rubber bulb and glass tube syringe 13, a stop watch 14, an auxiliary electrolyte cup 15 and a container 16 with a quantity of suitable electrolyte solution.

Attention is now directed to Fig. 2 in which the internal construction of the base 1 and the post 2 are shown. The electrical equipment required for operation of the apparatus is conventional and comprises a voltmeter 17 permanently connected across the electrolytic cell. It has been found that a Weston model 301 5-volt meter with resistance of 1000 ohms per volt is suitable. A Tripplett model 225 milliammeter 18 which has been equipped with an extra shunt and readjusted to furnish two scales is also provided. The regular scale is 50 milliamperes and the extra scale has a factor of one-fourth. The electrical current is supplied by a battery of dry cells 19 and the current may be suitably adjusted by the rheostat 21. The switch 22 is provided to open and to close the electrical circuit, and the switch 23 is provided to cut in or to cut out, as desired, the shunt 33 which is connected to the ammeter. The electrical connections within the base 1 are not shown inasmuch as the complete circuit may be traced more readily in the wiring diagram Fig. 4.

The mounting post 2 is preferably tubular and contains therewithin the rod 24 having a turning knob 25 secured to the uppermost end of the rod, the knob being guided by and enclosing the upper end of the post 2. The lowermost end of the rod 24 extends through and is in screw-threaded engagement with the bottom plate 26 of the base 1. This construction makes possible slight raising and lowering of one end of the base with the consequent raising and lowering of the electrolytic cell 7 for the purpose to be subsequently described herein in greater detail.

Fig. 3 shows in detail the construction of the electrolytic cell 7 which comprises the holder or supporting member 6, a frusto-conical cup 27 containing a quantity of suitable electrolyte 28, a perforated rubber sheet 29, or the like, the metallic plate 31 and the base 32.

The electrical diagram represented in Fig. 4 comprises the battery 19, the positive terminal of which is connected through the ammeter 18 to the plating 31. The negative terminal of the battery is connected through the switch 22 and the rheostat 21 to the electrolytic cell 7. The voltmeter 17 is connected across the line. The switch 23 and the shunt 33 are, as previously explained, provided to furnish the ammeter with an additional scale.

The principle of the instrument embodying our invention is essentially that of stripping metallic plate electrolytically at a fixed rate from a small area and determining the thickness thereof from the time required to remove the plate. In order to fix the rate of solution of the plate, it is necessary to maintain a constant and uniformly distributed current density over the area being stripped. The instrument must be capable of reproducing a given current density for each successive measurement of thickness made on each kind of plating. This is accomplished in two ways, as follows: (1) For substantially flat surfaces a means is provided for reproducing both the area and the total current. (2) For the measurement of plate upon a curved or irregular surface, the area and the total current are allowed to vary somewhat, but the current density is reproduced with reasonable accuracy by adjusting the voltage across the electrolytic cell.

For determining the thickness of chromium upon a substantially flat surface the following procedure has been found to be satisfactory: The rubber sheet 29, having a thickness of about $\frac{1}{16}$ inch and having an aperture 34 about $\frac{3}{16}$ inch in diameter therein, is placed over the surface area upon which it is desired to measure the thickness of the plate. The cup 27, which is preferably made of brass and which has an opening of approximately $\frac{9}{32}$ inch in diameter at its lower end, is placed upon the rubber sheet with the said opening concentric with the aperture 34. It is essential that pressure be applied to the rubber 29 by the cup 27 in order to prevent leakage of the electrolyte solution. The weight of the apparatus may be utilized to apply the pressure in the following manner: The rod 24 may be screwed downwardly until it supports one end of the apparatus. The arm 3 and the holding member 6 may then be adjusted to hold the cup 27 lightly upon the rubber sheet 29. The rod 24 may then be screwed upwardly whereby the weight of one end of the apparatus is placed upon the cup and rubber sheet.

An electrolyte solution which is suitable for determining the thickness of chromium is:

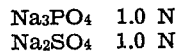

$Na_3PO_4$    1.0 N
$Na_2SO_4$    1.0 N

With the instrument in the adjusted position described above, the syringe 13 may be utilized to place a quantity of the electrolyte solution in the cup 27. It has been found that half a cupful of liquid is sufficient.

The switch 23 should be turned to cause the ammeter 18 to read upon the larger scale. The instrument is now ready to begin the measurement of the chromium thickness. To start the test the switch 22 is turned on and the stop watch 14 started simultaneously therewith. The current must then be immediately adjusted to a suitable value. It has been found that if a current of about 35.5 milliamperes is used, the thickness of the chromium in millionths of an inch is numerically equal to the time in seconds for the electrolytic cell to penetrate the layer of chromium. When the chromium subjacent the aperture 34 has been penetrated, there is a marked change in the current and voltage as readily observed on the ammeter 18 and voltmeter 17. The stop watch should be stopped at this instant and the elapsed time observed for computation of the chromium thickness.

For curved or irregular plated surfaces a similar rubber sheet having an aperture 34 about $\frac{3}{32}$ inch in diameter and a cup 27 having an opening in its lower end of about $\frac{1}{16}$ inch in diameter are preferably used. A quantity of electrolyte (about one-fourth the cup capacity) should be placed in the cup after the apparatus has been adjusted, as previously described in connection with the procedure to be used on a flat surface, for a test of the plate thickness. The switch 23 should be turned to cut out the shunt 33 whereupon the ammeter 18 will read upon the smaller scale.

The method for measuring the thickness of the chromium upon the curved or irregular surface is identical to the method described above for measuring the thickness of the chromium on a substantially flat surface with the exception that instead of adjusting the current to a predetermined value, the voltage is adjusted to a predetermined value. The thickness of the chromium is proportional, within reasonable limits, to the time of stripping, even though the area and current may vary somewhat with successive readings due to deformation of the rubber sheet upon the curved surfaces.

In the event that two or more layers of different metallic platings have been deposited one upon another and it is desired to measure the thickness of each, successive measurements may readily be made in the following manner: As previously described, the thickness of the outer plate may be determined. At the conclusion of that test the switch 22 should be turned off, the electrolyte 28 should be removed (preferably by the syringe 13 without disturbing the apparatus), the cell 7 thoroughly flushed with distilled water, then emptied and a second electrolyte placed in the cup 27. The second electrolyte should be of a composition suitable for forming an electrolytic cell with the metal of the second plating layer. The method of measuring the thickness of the outer plating may then be repeated for the determination of the thickness of the second layer. Obviously, if there are still other subjacent layers of plating, the method may be successively utilized in measuring the thickness of each layer.

The determination of metallic plating thickness which has been made available by this invention is rapid, economical and convenient. The article upon which measurements have been made needs only to be replated to restore it to its original condition, thus the usual waste caused by destruction of the article is avoided. That the results obtained are accurate within reasonable tolerances has been proved by actual comparative tests using other well known methods of measurement.

As many possible embodiments may be made of the above invention without departing from the scope thereof, it is to be understood that all matter hereinabove set forth is to be interpreted as illustrative and not in a limiting sense.

We claim:

An apparatus for measuring electrolytically the thickness of metallic plating, the apparatus having means for attachment to a source of electrical current and in which the plating serves as the anode, comprising in combination a frusto-conical container for an electrolyte, the frusto-conical form of the said container extending immediately upwardly and outwardly from its open bottom, the said container serving as the cathode, a gasket having an aperture therethrough of a diameter equal to the diameter of a local anodic area to be measured, the said gasket aperture being of substantially less diameter than the lower end of the open bottom of the said frusto-conical container, whereby when the said frusto-conical container is placed over the gasket aperture and the current is passed therethrough the distribution of current over the anodic area is substantially uniform throughout.

STANLEY ANDERSON.
ROBERT W. MANUEL.